United States Patent
Chen et al.

(10) Patent No.: US 10,460,094 B2
(45) Date of Patent: Oct. 29, 2019

(54) METHOD, APPARATUS, AND STORAGE MEDIUM FOR DATA PROCESSING

(71) Applicant: TENCENT TECHNOLOGY (SHENZHEN) COMPANY LIMITED, Shenzhen (CN)

(72) Inventors: Zebin Chen, Shenzhen (CN); Haifeng Ding, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 230 days.

(21) Appl. No.: 15/455,416

(22) Filed: Mar. 10, 2017

(65) Prior Publication Data

US 2017/0185764 A1 Jun. 29, 2017

Related U.S. Application Data

(63) Continuation of application No. PCT/CN2016/075643, filed on Mar. 4, 2016.

(30) Foreign Application Priority Data

Apr. 3, 2015 (CN) .......................... 2015 1 0158956

(51) Int. Cl.
*G06F 21/31* (2013.01)
*G06F 21/32* (2013.01)
(Continued)

(52) U.S. Cl.
CPC .............. *G06F 21/32* (2013.01); *G06F 21/31* (2013.01); *G06F 21/60* (2013.01); *G06F 21/602* (2013.01);
(Continued)

(58) Field of Classification Search
CPC ...................................................... G06F 21/32
See application file for complete search history.

(56) References Cited

U.S. PATENT DOCUMENTS

| 2012/0151218 | A1 | 6/2012 | Singh | |
| 2015/0264034 | A1* | 9/2015 | Mongillo, III | H04L 63/08 726/7 |
| 2016/0087957 | A1* | 3/2016 | Shah | H04L 63/205 726/1 |

FOREIGN PATENT DOCUMENTS

| CN | 103929312 A | 7/2014 |
| CN | 104463013 A | 3/2015 |

OTHER PUBLICATIONS

The World Intellectual Property Organization (WIPO) International Search Report for PCT/CN2016/075643 dated Jun. 7, 2016 6 Pages.

* cited by examiner

*Primary Examiner* — Josnel Jeudy
(74) *Attorney, Agent, or Firm* — Anova Law Group, PLLC

(57) ABSTRACT

Method, apparatus, and storage medium for data processing are provided. The method may include: obtaining an access configuration of encrypted data in a terminal, when receiving an access request for the encrypted data, the access configuration including a biometric key access method and/or a character key access method; outputting key entry prompt information according to the access configuration; performing a verification by calling a system API of the terminal to collect an entered target biometric key when a biometric key entry operation performed according to the key entry prompt information is detected, and obtaining a verification result; and responding to the access request according to the verification result. Encrypted data may thus be accessed based on a biometric key access method, an (Continued)

operation process of accessing encrypted data is simplified, data access efficiency and data processing efficiency are improved, and intelligence of a terminal is improved.

18 Claims, 10 Drawing Sheets

(51) Int. Cl.
    *G06F 21/60*         (2013.01)
    *G06F 21/62*         (2013.01)
    *H04L 9/32*           (2006.01)
    *H04L 29/06*         (2006.01)

(52) U.S. Cl.
    CPC ........ *G06F 21/6218* (2013.01); *H04L 9/3226* (2013.01); *H04L 9/3231* (2013.01); *H04L 63/0861* (2013.01); *G06F 2221/2107* (2013.01); *G06F 2221/2117* (2013.01)

METHOD, APPARATUS, AND STORAGE MEDIUM FOR DATA PROCESSING

RELATED APPLICATIONS

This application is a continuation of PCT Application No. PCT/CN2016/075643, filed on Mar. 4, 2016, which claims priority to Chinese Patent Application No. 201510158956.9, filed with the Chinese Patent Office on Apr. 3, 2015 and entitled "DATA PROCESSING METHOD AND APPARATUS, AND TERMINAL", all of which is incorporated herein by reference in their entirety.

FIELD OF THE TECHNOLOGY

The present disclosure relates to the field of Internet technologies, and specifically, to the field of data processing technologies, and in particular, to a method, apparatus, and storage medium for data processing.

BACKGROUND OF THE DISCLOSURE

With the development of Internet, terminals such as mobile phones and smart wearable devices have also been developed rapidly. Various Internet applications may be installed and operated in a terminal, and include, but are not limited to, an instant messaging application, a security application, and an input method application. Users may use the Internet applications in the terminal to satisfy various requirements such as social networking and information input of the users. Generally, an Internet application in a terminal can perform convenient management such as encryption and decryption on data in the terminal. For example, a security application in a terminal may manage a private picture in the terminal by using an encrypted album; or a security application in a terming may manage a private document by using an encrypted file. Currently, a numeric password method is usually used to access encrypted data in a terminal. For example, a user may set a numeric password for an encrypted album in a security application in a terminal, and view, delete, or modify a private picture in the encrypted album or perform another access operation on the private picture by entering the correct numeric password. However, in a data processing solution based on a numeric password access method, to access encrypted data each time, a user needs to enter a multi-digit numeric password. Such an operation is complex, and users often fail to access encrypted data because numeric passwords may be lost or forgotten.

SUMMARY

Embodiments of the present disclosure provide method, apparatus, and storage medium for data processing to access encrypted data based on a biometric key access method, so that operation process of accessing encrypted data is simplified, data access efficiency and data processing efficiency are improved, and intelligence of a terminal is improved.

One aspect of the present disclosure provides a data processing method, including:

obtaining an access configuration of encrypted data in a terminal when receiving an access request for the encrypted data, the access configuration including one or more of a biometric key access method and a character key access method;

outputting key entry prompt information according to the access configuration;

performing a verification by calling a system application programming interface (API) of the terminal to collect an entered target biometric key, when a biometric key entry operation performed according to the key entry prompt information is detected;

obtaining a verification result; and responding to the access request according to the verification result.

Another aspect of the present disclosure provides a data processing apparatus, including:

a configuration obtaining unit, configured to obtain an access configuration of encrypted data in a terminal when receiving an access request for the encrypted data, the access configuration including one or more of a biometric key access method and a character key access method;

an entry prompt unit, configured to output key entry prompt information according to the access configuration;

a biometric verification unit, configured to perform a verification by calling a system application programming interface (API) of the terminal to collect an entered target biometric key when a biometric key entry operation performed according to the key entry prompt information is detected, to obtain a verification result; and a data processing unit, configured to respond to the access request according to the verification result.

Another aspect of the present disclosure provides a terminal, which may include the disclosed data processing apparatus.

Implementation of the embodiments of the present disclosure has the following beneficial effects:

In the embodiments of the present disclosure, when an access request for encrypted data in a terminal is received, biometric key verification is performed by using a biometric key verification function built in a system of the terminal, and a response is made to the access request according to a verification result of the system of the terminal, so that access methods in existing data processing solutions are expanded. By means of an access method based on a biometric key such as a fingerprint key and a faceprint key, and/or an operation process of accessing encrypted data is simplified, data access efficiency and data processing efficiency are improved, and intelligence of a terminal is improved.

BRIEF DESCRIPTION OF THE DRAWINGS

To describe the technical solutions in the embodiments of the present disclosure or in the existing technologies more clearly, the following briefly describes the accompanying drawings required for describing the embodiments or the existing technologies. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
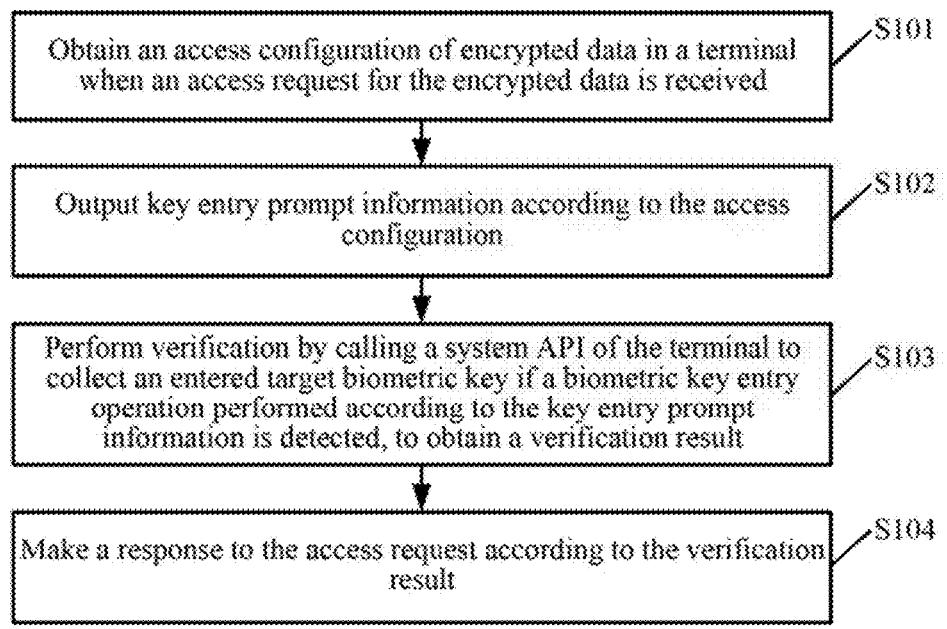
FIG. 1 is a flowchart of an exemplary data processing method according to an embodiment of the present disclosure.

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In embodiments of the present disclosure, a terminal may be a device such as a notebook computer, a mobile phone, a PAD (tablet computer), a vehicle terminal, a smart wearable device, or any suitable user terminal.

A system of the terminal refers to an operating system of the terminal, including, but not limited to, an iOS (a mobile operating system). Various Internet applications may be installed and operated in the terminal, and include, but are not limited to, an instant messaging application, an social networking service (SNS) application, a game application, a security application, and/or an input method application.

A character key refers to a key that uses a character as a basis for encryption and decryption, and includes, but is not limited to, a numeric key, a letter key, or a key that combines a digit and a letter.

A biometric key refers to a key that uses a biometric feature as a basis for encryption and decryption, and includes, but is not limited to, a fingerprint key, a faceprint key, or a pupil key.

Encrypted data in the terminal may include, but is not limited to, an encrypted file in the terminal, an encrypted picture in the terminal, or encrypted audio or an encrypted video in the terminal.

An Internet application in a terminal can perform convenient management such as encryption and decryption on data in the terminal. For example, a security application in a terminal may manage a private picture in the terminal by using an encrypted album; or a security application in a terminal may manage a private document by using an encrypted file. Currently, a character key method is usually used to access encrypted data in a terminal. For example, a user may set a character key for an encrypted album in a security application in a terminal, and view, delete, or modify a private picture in the encrypted album or perform another access operation on the private picture by entering the correct character key. However, in a data processing solution based on a character key access method, to access encrypted data each time, a user needs to enter a character key. As a result, an operation is complex, and users often fail to access encrypted data because character keys get lost or forgotten.

By means of the data processing solution provided in the present disclosure, access methods in current data processing solutions can be expanded, that is, based on a biometric key access method, when receiving an access request for encrypted data in a terminal, biometric key verification may be performed by using a biometric key verification function built in a system of the terminal, and a response is made to the access request according to a verification result of the system of the terminal, so that an operation process of accessing encrypted data is simplified, data access efficiency and data processing efficiency are improved, and intelligence of a terminal is improved.

In various embodiments, the biometric key access method may be implemented in combination with the character key access method. For example, the character key access method may be performed either before or after the biometric key access method to improve intelligence of the terminal for accessing the encrypted data.

Based on the foregoing descriptions, an implementation of a data processing method provided in an embodiment of the present disclosure is described below in detail with reference to the accompanying drawings FIG. 1 to FIG. 8.

Referring to FIG. 1, FIG. 1 is a flowchart of a data processing method according to an embodiment of the present disclosure. The method may include the following Step S101 to Step S104.

S101: Obtain an access configuration of encrypted data in a terminal, when receiving an access request for the encrypted data, the access configuration including a biometric key access method and/or a character key access method.

The access configuration of the encrypted data may be used to describe an access method configured for the encrypted data, and the access method may include, but is not limited to, the biometric key access method and/or the character key access method. In a specific implementation, the access configuration of the encrypted data may be pre-stored in the terminal, and when the access request for the encrypted data in the terminal is received, the access configuration of the encrypted data may be obtained from storage space of the terminal.

S102: Output key entry prompt information according to the access configuration.

In a specific implementation, when the access configuration includes the biometric key access method, the key entry prompt information is used to prompt a user to enter a biometric key; when the access configuration includes the character key access method, the key entry prompt information is used to prompt a user to enter a character key; and when the access configuration includes a biometric key access method and the character key access method, the key entry prompt information is used to prompt a user to select to enter a biometric key or a character key.

S103: Perform verification by calling a system API of the terminal to collect an entered target biometric key, when a biometric key entry operation performed according to the key entry prompt information is detected, to obtain a verification result.

A biometric key verification function is built in systems of terminals. For example, a terminal with an iOS-8 system may support screen unlocking with a fingerprint, that is, the iOS system verifies a fingerprint key and unlocks the screen of the terminal after the verification succeeds. To reduce pressure of developing Internet applications, the Internet application in the terminal in the present disclosure may use the biometric key verification function built in the system of the terminal. That is, the system of the terminal exposes, to the Internet application, a system API that is used to perform biometric key verification. When a biometric key entry operation performed according to the key entry prompt information is detected, the Internet application in the terminal may call the system API that is used to perform biometric key verification and that is exposed by the system of the terminal, and the system of the terminal performs verification by collecting an entered target biometric key by using the system API, to obtain a verification result. Further, after obtaining the verification result, the system of the terminal may feed back the verification result to the Internet application in the terminal by using the system API.

S104: Respond to the access request according to the verification result.

The verification result includes that the verification succeeds or the verification fails. When the verification result is that the verification succeeds, content of the encrypted data may be displayed to respond to the access request, when the verification result is that verification fails, access failure prompt information may be output to respond to the access request.

When an access request for encrypted data in a terminal is received, biometric key verification is performed by using a biometric key verification function built in a system of the terminal, and a response is made to the access request according to a verification result of the system of the terminal, so that access methods in existing data processing solutions are expanded. By means of an access method based on a biometric key such as a fingerprint key and a faceprint key, an operation process of accessing encrypted data is simplified, data access efficiency and data processing efficiency are improved, and intelligence of a terminal is improved.

Figure 2:
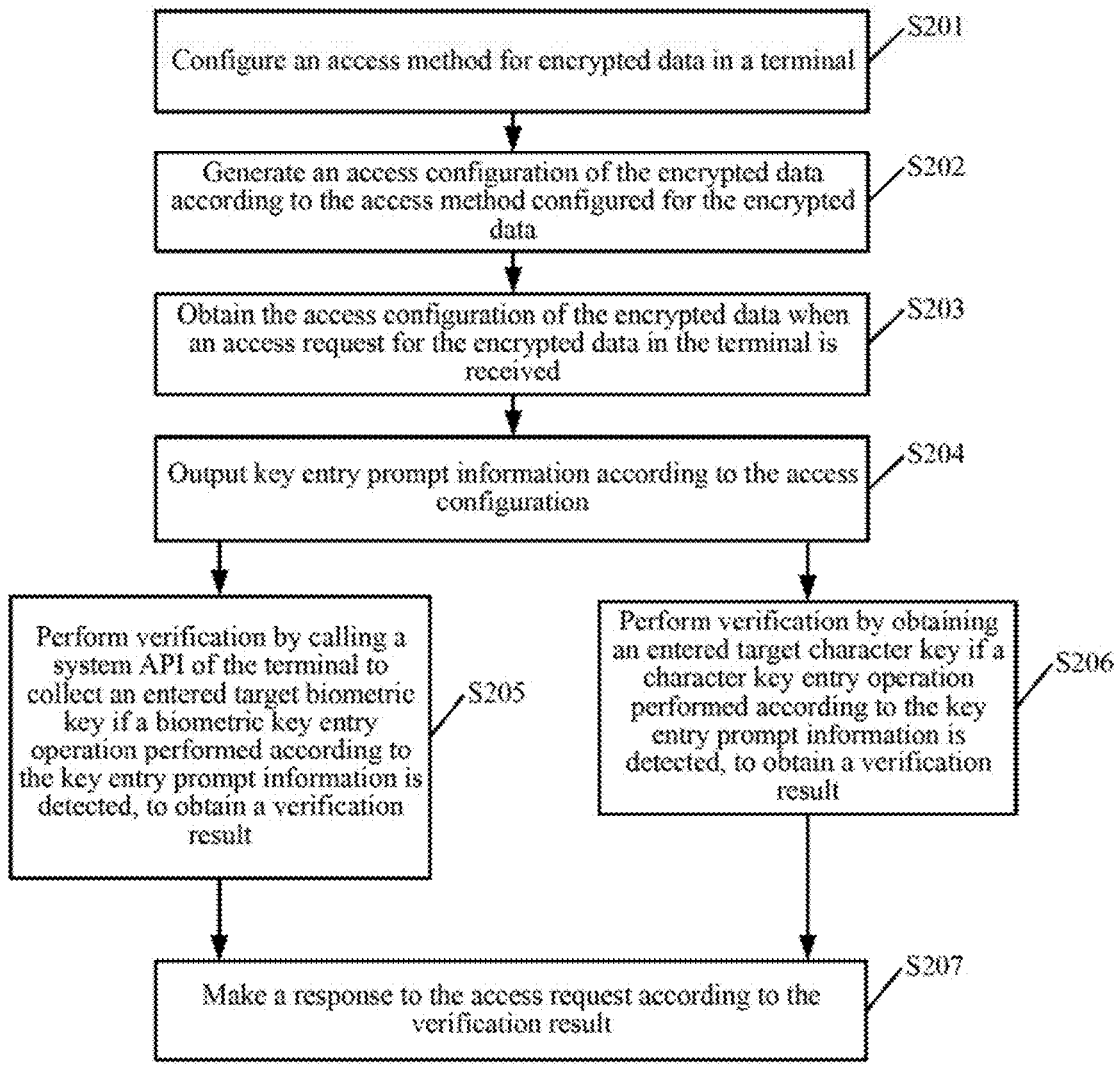
FIG. 2 is a flowchart of another exemplary data processing method according to an embodiment of the present disclosure.

Referring to FIG. 2, FIG. 2 is a flowchart of another data processing method according to an embodiment of the present disclosure. The method may include the following Step S201 to Step S204.

S201: Configure an access method for encrypted data in a terminal.

The encrypted data in the terminal may include, but is not limited to, an encrypted file in the terminal, an encrypted picture in the terminal, or encrypted audio or an encrypted video in the terminal. Generally, an Internet application in a terminal can perform convenient management such as encryption and decryption on data in the terminal. For example, a security application in a terminal may manage a private picture in the terminal by using an encrypted album; or a security application in a terminal may manage a private document by using an encrypted file. Further, the Internet application in the terminal may provide a configuration interface, so that a user may configure, in the configuration interface, the access method for the encrypted data in the terminal. The access method may include, but is not limited to, a biometric key access method and/or a character key access method.

Figure 3:
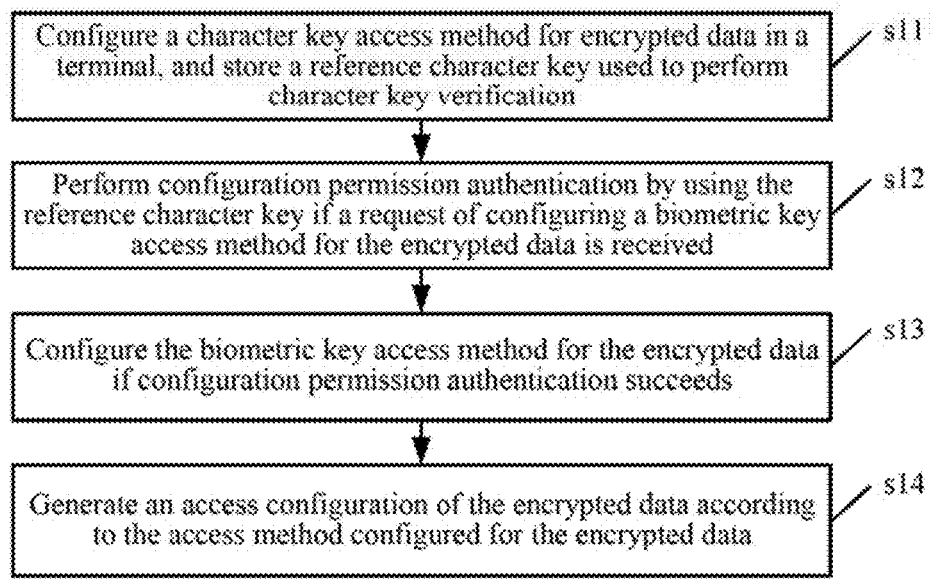
FIG. 3 is a flowchart of an embodiment of Step S201 shown in FIG. 2.

Referring to FIG. 3 together with FIG. 2, FIG. 3 is a flowchart of an embodiment of Step S201 shown in FIG. 2. Step S201 specifically includes the following exemplary steps s11 to s13.

s11: Configure a character key access method for the encrypted data in the terminal, and store a reference character key used to perform character key verification.

Figure 4A:
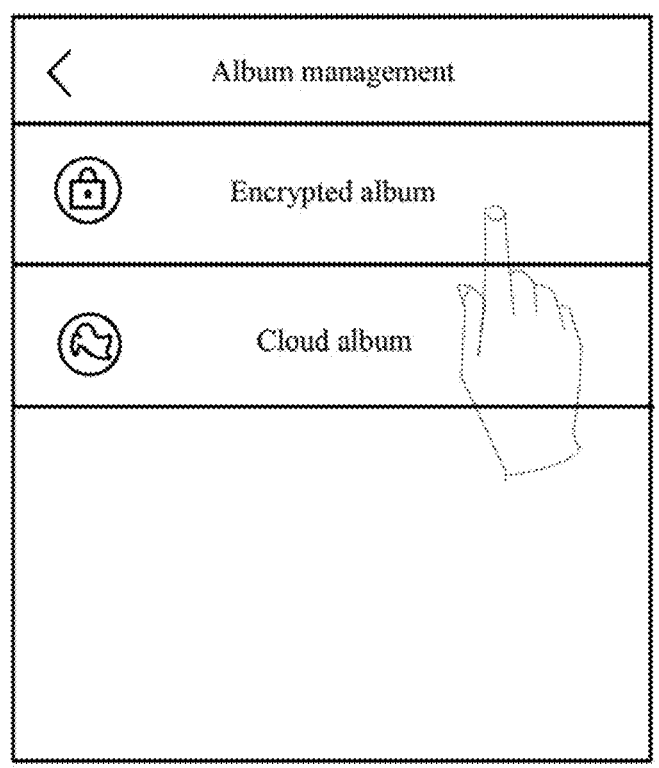
FIG. 4a is a schematic diagram of an exemplary configuration interface according to an embodiment of the present disclosure.
Figure 4B:
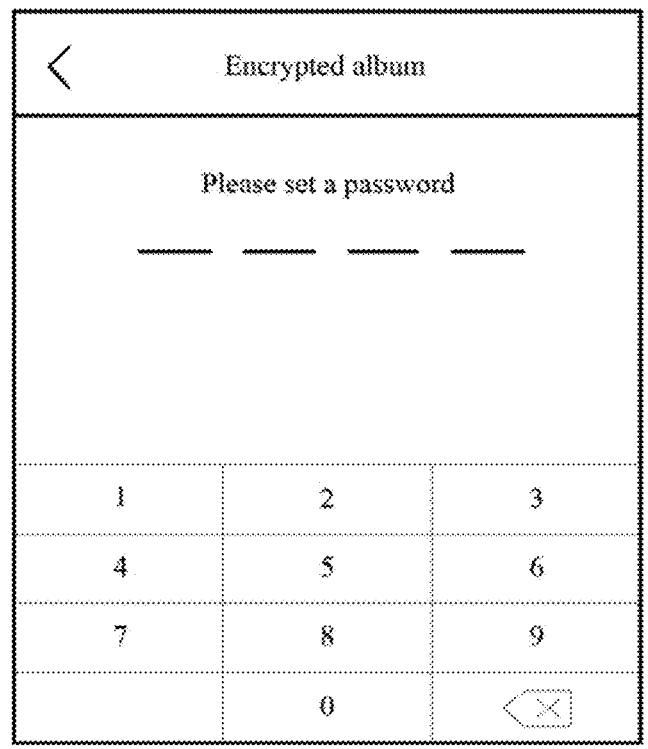
FIG. 4b is schematic diagram of another exemplary configuration interface according to an embodiment of the present disclosure.

In step s11, a user may configure, in a configuration interface provided by an Internet application a character key access method for the encrypted data in the terminal. Referring to FIG. 4a and FIG. 4b together, FIG. 4a and FIG. 4b are schematic diagrams of a configuration interface according to an embodiment of the present disclosure. An encrypted album shown in FIG. 4a is used as an example. The user may configure, in a configuration interface shown in FIG. 4b, a character key for an encrypted album in the security application in the terminal. The character key set by the user may be used as the reference character key that is used to perform character key verification, and stored in the terminal. For example, assuming that the user configures, in the configuration interface shown in FIG. 4b, a character key "2351", "2351" is used as the reference character key and stored in the terminal.

s12: Perform configuration permission authentication by using the reference character key when a request of configuring the biometric key access method for the encrypted data is received. In one embodiment, configuration permission authentication is performed before the biometric key access method is configured for the encrypted data, so that security of the encrypted data can be ensured, and use security of the biometric key access method is ensured.

s13: Configure the biometric key access method for the encrypted data when configuration permission authentication succeeds.

Figure 4C:
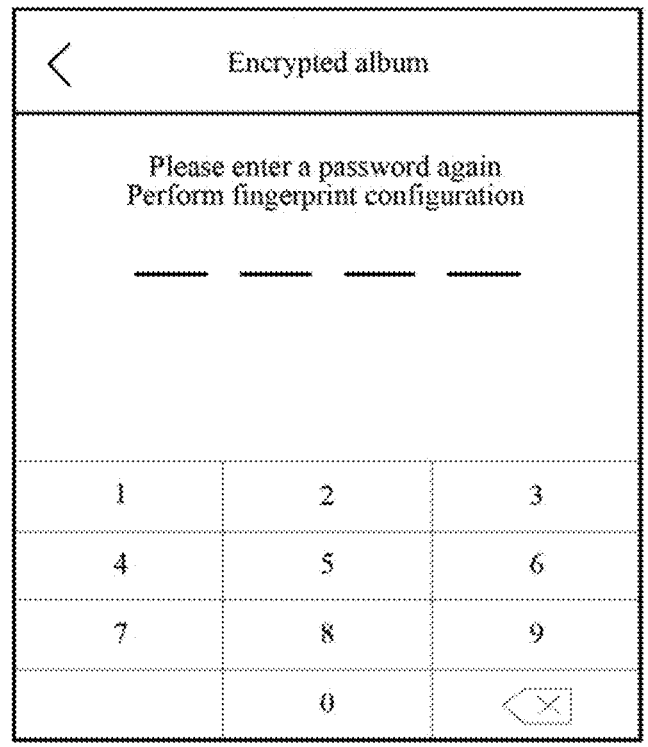
FIG. 4c is a schematic diagram of another exemplary configuration interface according to an embodiment of the present disclosure.
Figure 4D:
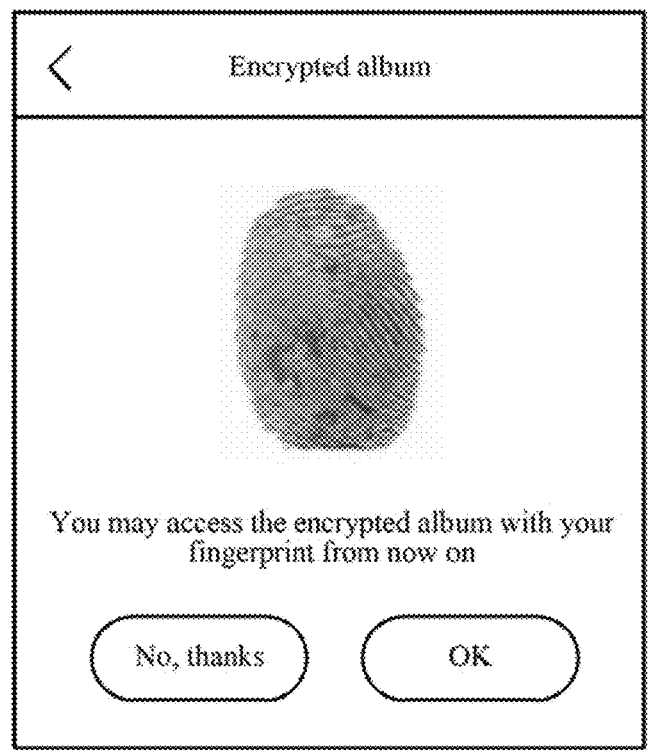
FIG. 4d is another schematic diagram of another exemplary configuration interface according to an embodiment of the present disclosure.

Referring to FIG. 4c and FIG. 4d together, FIG. 4c and FIG. 4d are schematic diagrams of another configuration interface according to an embodiment of the present disclosure, when the request of configuring the biometric key access method for the encrypted data is received, an interface shown in FIG. 4c may be output, and the character key is required to be entered to perform configuration permission authentication, when the character key entered in the interface shown in FIG. 4c is the same as the reference character key, configuration permission authentication succeeds, indicating that the biometric key access method can be configured for the encrypted data, when the character key entered in the interface shown in FIG. 4c is different from the reference character key, configuration permission authentication fails, indicating that the biometric key access method cannot be configured for the encrypted data. According to the example shown in step s11, when the user enters the digits "2351" in the interface shown in FIG. 4c, in step s12, it may be determined that the entered digits are the same as the stored reference character key "2351", and configuration permission authentication succeeds, in step s13, an interface shown in FIG. 4d may be output to prompt the user that the biometric key access method is configured successfully for the encrypted data, and subsequently the biometric key access method may be used to access the encrypted data.

S202: Generate an access configuration of the encrypted data according to the access method configured for the encrypted data.

The access configuration of the encrypted data may be used to describe the access method configured for the encrypted data. The access configuration of the encrypted data may be generated according to the access method configured in Step S201.

S203: Obtain the access configuration of the encrypted data when an access request for the encrypted data in the terminal is received, the access configuration including a biometric key access method and/or a character key access method.

In a specific implementation, the access configuration of the encrypted data may be pre-stored in the terminal, and when the access request for the encrypted data in the terminal is received, the access configuration of the encrypted data may be obtained from storage space of the terminal.

S204: Output key entry prompt information according to the access configuration.

Figure 5A:
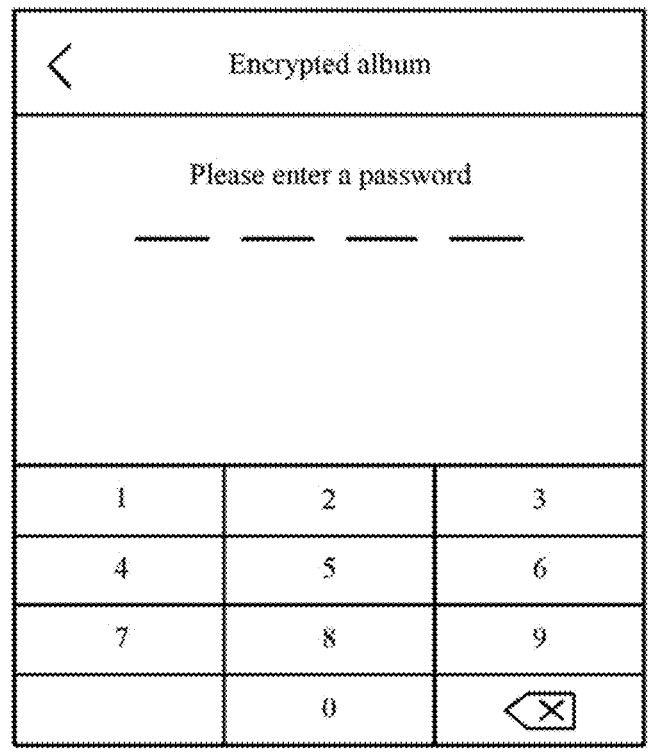
FIG. 5a is a schematic diagram of an exemplary piece of key entry prompt information according to an embodiment of the present disclosure.
Figure 5B:
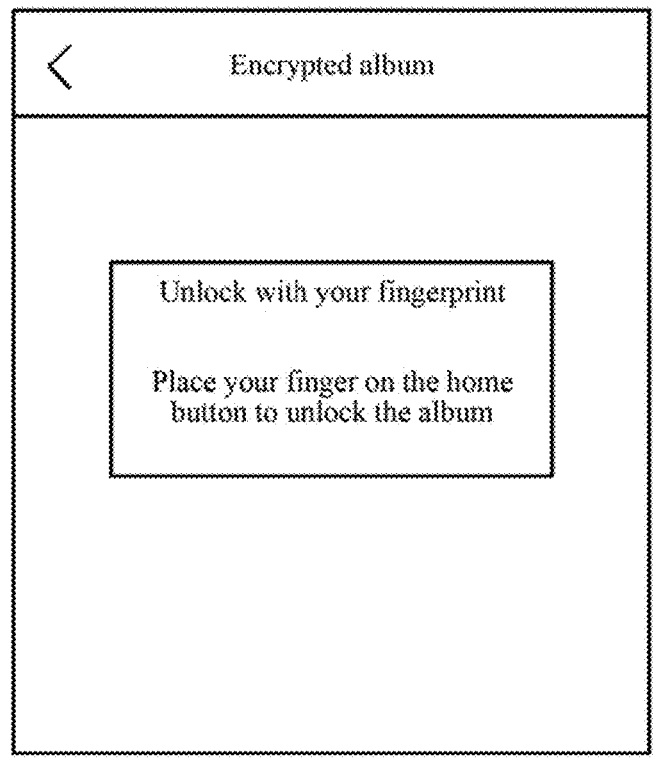
FIG. 5b is a schematic diagram of another exemplary piece of key entry prompt information according to an embodiment of the present disclosure.
Figure 5C:
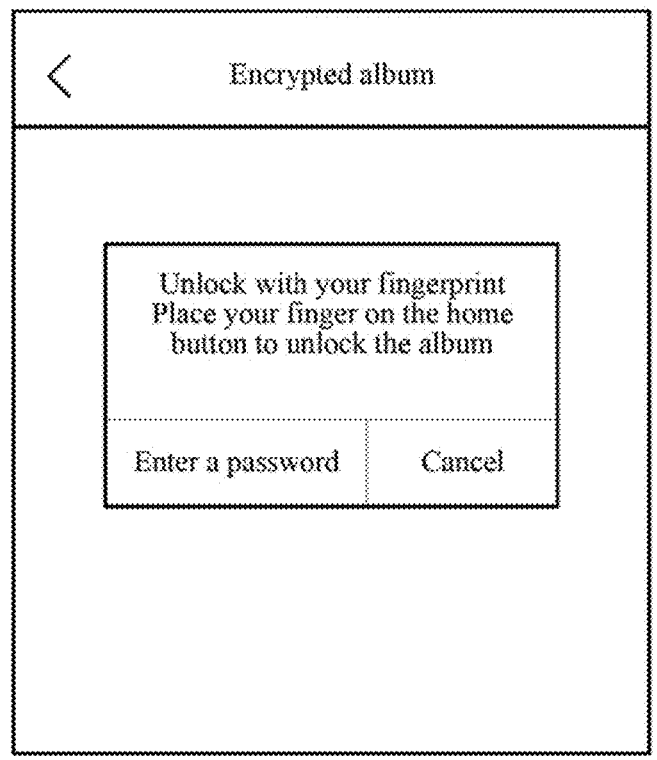
FIG. 5c is a schematic diagram of still another exemplary piece of key entry prompt information according to an embodiment of the present disclosure.

Step S204 may have the following possible implementation manners. In a first possible implementation manner, when the access configuration includes the biometric key access method, the key entry prompt information is used to prompt a user to enter a biometric key. For this implementation manner, reference may together be made to FIG. 5a. FIG. 5a is a schematic diagram of key entry prompt information according to an embodiment of the present disclosure. In a second possible implementation manner, when the access configuration includes the character key access method, the key entry prompt information is used to prompt a user to enter a character key. For this implementation, reference may together be made to FIG. 5b. FIG. 5b is a schematic diagram of another piece of key entry prompt information according to an embodiment of the present disclosure. In a third possible implementation manner, when the access configuration includes a biometric key access method and the character key access method, the key entry prompt information is used to prompt a user to select to enter a biometric key or a character key. For this implementation, reference may together be made to FIG. 5c. FIG. 5c is a schematic diagram of still another piece of key entry prompt information according to an embodiment of the present disclosure.

S205: Perform verification by calling a system API of the terminal to collect an entered target biometric key when a biometric key entry operation performed according to the key entry prompt information is detected, to obtain a verification result; and subsequently, the process turns to Step S207.

A biometric key verification function may be built in systems of terminals. For example, a terminal with an iOS-8 system may support screen unlocking with a fingerprint, that is, the iOS system verifies a fingerprint key and unlocks the screen of the terminal after verification succeeds. To reduce pressure of developing Internet applications, the Internet application in the terminal in the present disclosure may use the biometric key verification function built in the system of the terminal. That is, the system of the terminal exposes, to the Internet application, a system API that is used to perform biometric key verification. When a biometric key entry operation performed according to the key entry prompt information is detected, the Internet application in the terminal may call the system API that is used to perform biometric key verification and that is exposed by the system of the terminal, and the system of the terminal performs verification by collecting an entered target biometric key by using the system API, to obtain a verification result. Further, after obtaining the verification result, the system of the terminal may feed back the verification result to the Internet application in the terminal by using the system API.

Figure 6:
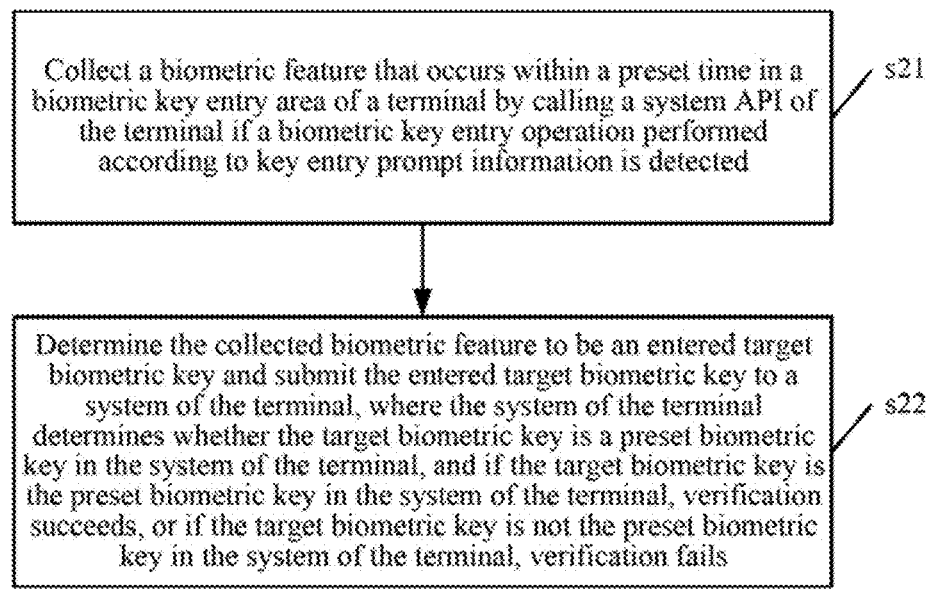
FIG. 6 is a flowchart of an embodiment of Step S205 shown in FIG. 2.

Referring to FIG. 6, FIG. 6 is a flowchart of an embodiment of Step S205 shown in FIG. 2. Step S201 specifically includes the following exemplary steps s21 and s22.

s1: Collect, by calling the system API of the terminal, a biometric feature that is shown within a preset time in a biometric key entry area of the terminal, when the biometric key entry operation performed according to the key entry prompt information is detected.

The preset time may be set according to an actual requirement. For example, the preset time may be set to 2 s, 3 s, and the like. The biometric key entry area may refer to an area defined by the terminal and used to collect a biometric feature, and may be any part of an area or a whole area on a screen of the terminal, or may be a specific button area of the terminal. For example, in a terminal with an iOS system, an area at which the home button is located may be a fingerprint key entry area of the terminal, and when a user places a finger on the area of the home button, the terminal may collect a fingerprint feature of the user.

s22: Determine the collected biometric feature to be the entered target biometric key and submit the entered target biometric key to a system of the terminal, where the system of the terminal determines whether the target biometric key is a preset biometric key in the system of the terminal, and when the target biometric key is the preset biometric key in the system of the terminal, verification succeeds, or when the target biometric key is not the preset biometric key in the system of the terminal, verification fails.

The preset biometric key may be preset and stored by the user in the terminal. In step s22, the system of the terminal may perform comparison and recognition on the target biometric key and the preset biometric key by using biological recognition technologies such as fingerprint comparison and faceprint recognition. When the target biometric key matches the preset biometric key (that is, the target biometric key and the preset biometric key are the same or have a similarity degree being greater than a preset threshold), verification succeeds, or when the target biometric key does not match the preset biometric key, verification fails. Further, after obtaining the verification result, the system of the terminal may feed back the verification result to the Internet application in the terminal by using the system API.

S206: Perform verification by obtaining an entered target character key when a character key entry operation performed according to the key entry prompt information is detected, to obtain a verification result.

The Internet application in the terminal may perform convenient management on the encrypted data in the terminal based on the character key. Therefore, the Internet application in the terminal has a built-in function of verifying the character key. When the character key entry operation performed according to the key entry prompt information is detected, the Internet application in the terminal may directly perform verification by obtaining the entered target character key, to obtain the verification result.

Figure 7:
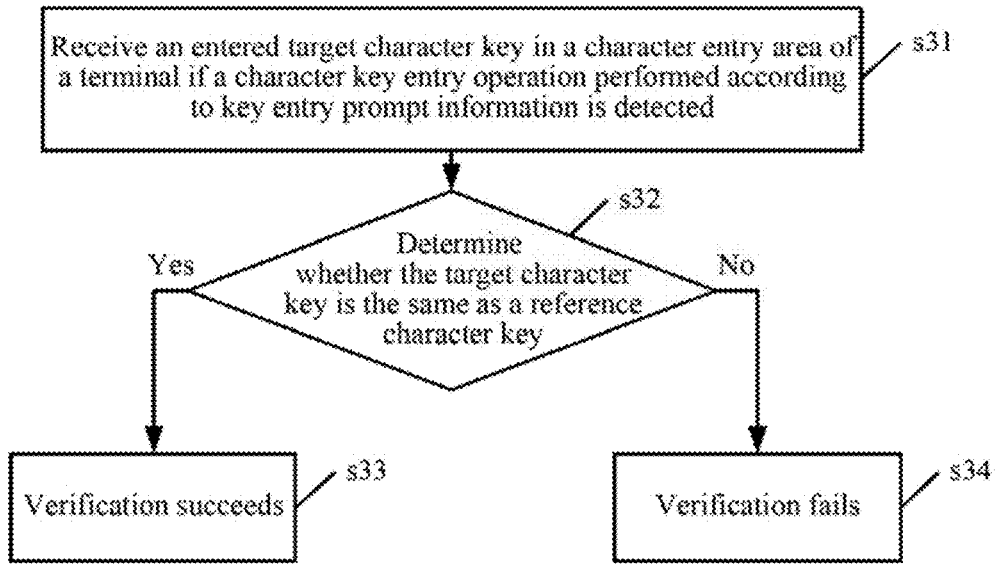
FIG. 7 is a flowchart of an embodiment of Step S206 shown in FIG. 2.

Referring to FIG. 7 together, FIG. 7 is a flowchart of an embodiment of Step S206 shown in FIG. 2. Step S206 specifically includes the following exemplar steps s31 to s34.

s31: Receive the entered target character key in a character entry area of the terminal when the character key entry operation performed according to the key entry prompt information is detected.

The character key entry area may refer to an area provided by the terminal and used to enter a character, and may be a virtual keyboard of the terminal. In step s31, the entered target character key is received in the character entry area of the terminal when the character key entry operation performed according to the key entry prompt information is detected.

s32: Determine whether the target character key is the same as the reference character key; and when a determining result is yes, the process turns to step s33 that verification succeeds, or when a determining result is no, the process turns to step s34 that verification fails.

S207: Respond to the access request according to the verification result.

The verification result includes that verification succeeds or verification fails. When the verification result is that verification succeeds, content of the encrypted data is displayed, or when the verification result is that verification fails, access failure prompt information is output.

In the present disclosure, when an access request for encrypted data in a terminal is received, biometric key verification is performed by using a biometric key verification function built in a system of the terminal, and a response is made to the access request according to a verification result of the system of the terminal, so that access methods in existing data processing solutions are expanded. By means of an access method based on a biometric key such as a fingerprint key and a faceprint key, an operation process of accessing encrypted data is simplified, data access efficiency and data processing efficiency are improved, and intelligence of a terminal is improved.

A structure and function of a data processing apparatus provided in an embodiment of the present disclosure is described below in detail with reference to FIG. 8 to FIG. 12. It should be noted that the following apparatus may be an Internet application installed and operated in a terminal that is to be applied to perform the data processing method shown in FIG. 1 to FIG. 6.

Figure 8:
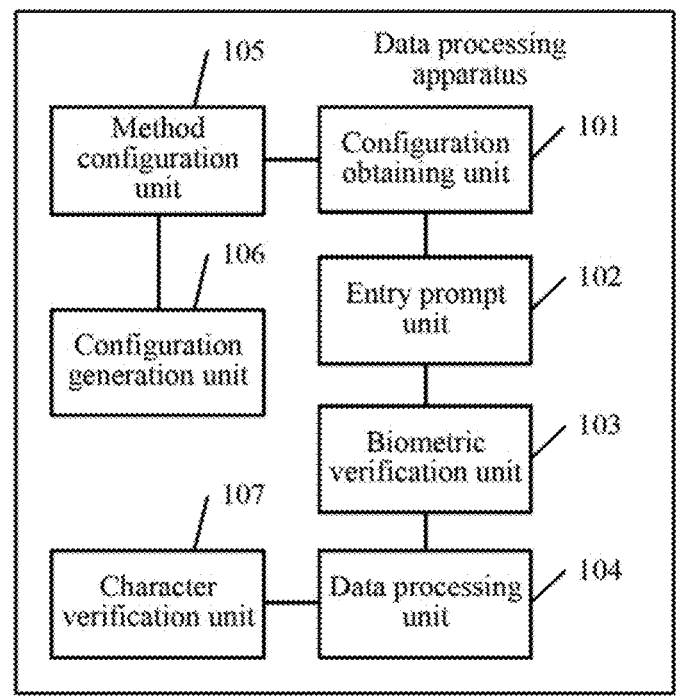
FIG. 8 is a schematic structural diagram of an exemplary data processing apparatus according to an embodiment of the present disclosure.

Referring to FIG. 8, FIG. 8 is a schematic structural diagram of a data processing apparatus according to an embodiment of the present disclosure. The apparatus may include: a configuration obtaining unit 101, an entry prompt unit 102, a biometric verification unit 103, and a data processing unit 104.

The configuration obtaining unit 101 is configured to obtain an access configuration of encrypted data in a terminal when an access request for the encrypted data is received, the access configuration including a biometric key access method and/or a character key access method.

The access configuration of the encrypted data may be used to describe an access method configured tier the encrypted data, and the access method may include, but is not limited to, the biometric key access method and/or the character key access method. In a specific implementation, the access configuration of the encrypted data may be pre-stored in the terminal, and when receiving the access request for the encrypted data in the terminal, the configuration obtaining unit 101 may obtain the access configuration of the encrypted data from storage space of the terminal.

The entry prompt unit 102 is configured to output key entry prompt information according to the access configuration.

In a specific implementation, when the access configuration includes the biometric key access method, the key entry prompt information is used to prompt a user to enter a biometric key; when the access configuration includes the character key access method, the key entry prompt information is used to prompt a user to enter a character key; and when the access configuration includes a biometric key access method and the character key access method, the key entry prompt information is used to prompt a user to select to enter a biometric key or a character key.

The biometric verification unit 103 is configured to perform verification by calling a system API of the terminal to collect an entered target biometric key when a biometric key entry operation performed according to the key entry prompt information is detected, to obtain a verification result.

Currently, a biometric key verification function is built in systems of most terminals. For example, a terminal with an iOS-8 system may support screen unlocking with a fingerprint, that is, the iOS system verifies a fingerprint key and unlocks the screen of the terminal after verification succeeds. To reduce pressure of developing Internet applications, the Internet application in the terminal in the present disclosure may use the biometric key verification function built in the system of the terminal. That is, the system of the terminal exposes, to the Internet application, a system API that is used to perform biometric key verification. When a biometric key entry operation performed according to the key entry prompt information is detected, the biometric verification unit 103 may call the system API that is used to perform biometric key verification and that is exposed by the system of the terminal, and the system of the terminal performs verification by collecting an entered target biometric key by using the system API, to obtain a verification result. Further, after obtaining the verification result, the system of the terminal may feed back the verification result to the Internet application in the terminal by using the system API.

The data processing unit 104 is configured to respond to the access request according to the verification result.

The verification result includes that verification succeeds or verification fails, when the verification result is that verification succeeds, the data processing unit 104 may display content of the encrypted data to respond to the access request, when the verification result is that verification fails, the data processing unit 104 may output access failure prompt information to respond to the access request.

Referring to FIG. 8 again, the apparatus may further include: a method configuration unit 105 and a configuration generation unit 106.

The method configuration unit 105 is configured to configure an access method for the encrypted data in the terminal.

The encrypted data in the terminal may include, but is not limited to, an encrypted file in the terminal, an encrypted picture in the terminal, or encrypted audio or an encrypted video in the terminal. Generally, an Internet application in a terminal can perform convenient management such as encryption and decryption on data in the terminal. For example, a security application in a terminal may manage a private picture in the terminal by using an encrypted album; or a security application in a terminal may manage a private document by using an encrypted file. Further, the Internet application in the terminal may, provide a configuration interface, so that a user may configure, in the configuration interface, the access method for the encrypted data in the terminal. The access method may include, but is not limited to, a biometric key access method and/or a character key access method.

The configuration generation unit 106 is configured to generate the access configuration of the encrypted data according to the access method configured for the encrypted data.

The access configuration of the encrypted data may be used to describe the access method configured for the encrypted data. The configuration generation unit 106 may generate the access configuration of the encrypted data according to the configured access method.

Referring to FIG. 8 again, the apparatus may further include a character verification unit 107.

The character verification unit 107 is configured to perform verification by obtaining an entered target character key when a character key entry operation performed according to the key entry prompt information is detected, to obtain a verification result.

The Internet application in the terminal may perform convenient management on the encrypted data in the terminal based on the character key. Therefore, the Internet application in the terminal has a built-in function of verifying the character key, when the character key entry operation performed according to the key entry prompt information is detected, the character verification unit 107 may directly perform verification by obtaining the entered target character key, to obtain the verification result.

In the present disclosure, when an access request for encrypted data in a terminal is received, biometric key verification is performed by using a biometric key verification function built in a system of the terminal, and a response is made to the access request according to a verification result of the system of the terminal, so that access methods in existing data processing solutions are expanded. By means of an access method based on a biometric key such as a fingerprint key and a faceprint key, an operation process of accessing encrypted data is simplified, data access efficiency and data processing efficiency are improved, and intelligence of a terminal is improved.

Figure 9:
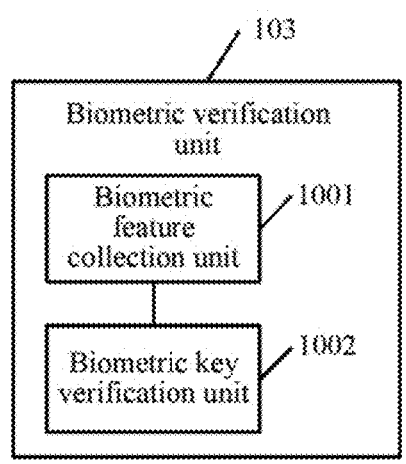
FIG. 9 is a schematic structural diagram of an embodiment of a biometric verification unit shown in FIG. 8.

Referring to FIG. 9, FIG. 9 is a schematic structural diagram of an embodiment of an exemplary biometric verification unit 103 shown in FIG. 8. The exemplary biometric verification unit 103 may include: a biometric feature collection unit 1001 and a biometric key verification unit 1002.

The biometric feature collection unit 1001 is configured to: collect, by calling the system API of the terminal, a biometric feature that is shown within a preset time in a biometric key entry area of the terminal when the biometric key entry operation performed according to the key entry prompt information is detected.

The preset time may be set according to an actual requirement. For example, the preset time may be set to 2 s, 3 s, and the like. The biometric key entry area may refer to an area defined by the terminal and used to collect a biometric feature, and may be any part of an area or a whole area on a screen of the terminal, or may be a specific button area of the terminal. For example, in a terminal with an iOS system, an area at which the home button is located may be a fingerprint key entry area of the terminal, and when a user places a finger on the area of the home button, the biometric feature collection unit 1001 may collect a fingerprint feature of the user.

The biometric key verification unit 1002 is configured to: determine the collected biometric feature to be the entered target biometric key and submit the entered target biometric key to a system of the terminal, where the system of the terminal determines whether the target biometric key is a preset biometric key in the system of the terminal, and when the target biometric key is the preset biometric key in the system of the terminal, verification succeeds, or when the target biometric key is not the preset biometric key in the system of the terminal, verification fails.

The preset biometric key may be preset and stored by the user in the terminal, and the biometric key verification unit 1002 may perform comparison and recognition on the target biometric key and the preset biometric key by using biological recognition technologies such as fingerprint comparison and faceprint recognition. When the target biometric key matches the preset biometric key (that is, the target biometric key and the preset biometric key are the same or have a similarity degree being greater than a preset threshold), verification succeeds, or when the target biometric key does not match the preset biometric key, verification fails. Further, after obtaining the verification result, the system of the terminal may feed back the verification result to the Internet application in the terminal by using the system API.

In the present disclosure, when an access request for encrypted data in a terminal is received, biometric key verification is performed by using a biometric key verification function built in a system of the terminal, and a response is made to the access request according to a verification result of the system of the terminal, so that access methods in existing data processing solutions are expanded. By means of an access method based on a biometric key such as a fingerprint key and a faceprint key, an operation process of accessing encrypted data is simplified, data access efficiency and data processing efficiency are improved, and intelligence of a terminal is improved.

Figure 10:
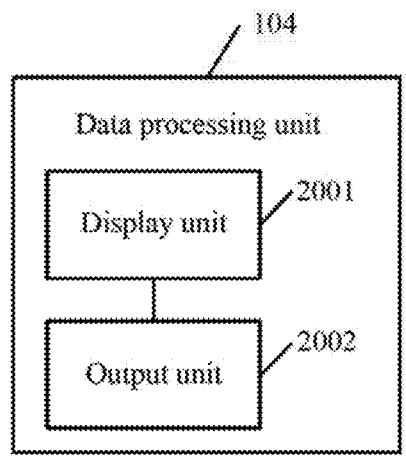
FIG. 10 is a schematic structural diagram of an embodiment of a data processing unit shown in FIG. 8.

Referring to FIG. 10, FIG. 10 is a schematic structural diagram of an embodiment of an exemplary data processing unit 104 shown in FIG. 8. The exemplary data processing unit 104 may include: a display unit 2001 and an output unit 2002.

The display unit 2001 is configured to display content of the encrypted data when the verification result is that verification succeeds.

The output unit 2002 is configured to output access failure prompt information when the verification result is that verification fails.

In the present disclosure, when an access request for encrypted data in a terminal is received, biometric key verification is performed by using a biometric key verification function built in a system of the terminal, and a response is made to the access request according to a verification result of the system of the terminal, so that access methods in existing data processing solutions are expanded. By means of an access method based on a biometric key such as a fingerprint key and a faceprint key, an operation process of accessing encrypted data is simplified, data access efficiency and data processing efficiency are improved, and intelligence of a terminal is improved.

Figure 11:
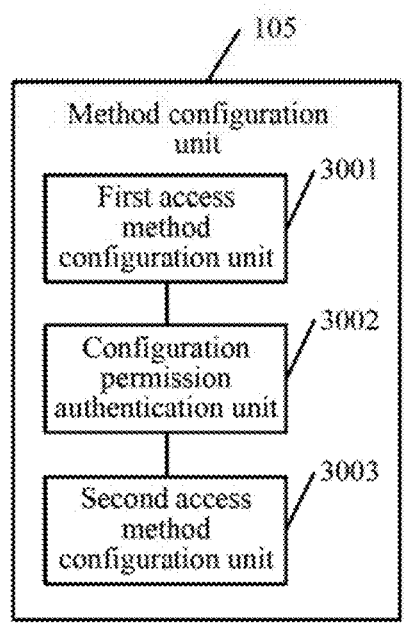
FIG. 11 is a schematic structural diagram of an embodiment of a method configuration unit shown in FIG. 8.

Referring to FIG. 11, FIG. 11 is a schematic structural diagram of an embodiment of a method configuration unit shown in FIG. 8. The method configuration unit 105 may include: a first access method configuration unit 3001, a configuration permission authentication unit 3002, and a second access method configuration unit 3003.

The first access method configuration unit 3001 is configured to: configure a character key access method for the encrypted data in the terminal, and store a reference character key used to perform character key verification.

A user may configure, in a configuration interface provided by an Internet application, a character key access method for the encrypted data in the terminal. Referring to FIG. 4a and FIG. 4b together, an encrypted album shown in FIG. 4a is used as an example. The user may configure, in a configuration interface shown in FIG. 4b, a character key for an encrypted album in the security application in the terminal. The character key set by the user may be used as the reference character key that is used to perform character key verification, and stored in the terminal. For example, assuming that the user configures, in the configuration interface shown in FIG. 4b, character key "2351", "2351" is used as the reference character key and stored in the terminal.

The configuration permission authentication unit 3002 is configured to perform configuration permission authentication by using the reference character key when a request of configuring the biometric key access method for the encrypted data is received. In this embodiment, configuration permission authentication is performed before the biometric key access method is configured for the encrypted data, so that security of the encrypted data can be ensured, and use security of the biometric key access method is ensured.

The second access method configuration unit 3003 is configured to configure the biometric key access method for the encrypted data when configuration permission authentication succeeds.

Referring to FIG. 4c and FIG. 4d together, when the request of configuring the biometric key access method for the encrypted data is received, an interface shown in FIG. 4c may be output, and the character key is required to be entered to perform configuration permission authentication, when the character key entered in the interface shown in FIG. 4c is the same as the reference character key, configuration permission authentication succeeds, indicating that the biometric key access method can be configured for the encrypted data, when the character key entered in the interface shown in FIG. 4c is different from the reference character key, configuration permission authentication fails, indicating that the biometric key access method cannot be configured for the encrypted data. According to the example shown in this embodiment, when the user enters the digits "2351" in the interface shown in FIG. 4c, the configuration permission authentication unit 3002 may determine that the entered digits are the same as the stored reference character key "2351", and configuration permission authentication succeeds. The second access method configuration unit 3003 may output an interface shown in FIG. 4d, to prompt the user that the biometric key access method is configured successfully for the encrypted data, and subsequently the biometric key access method may be used to access the encrypted data.

In the present disclosure, when an access request for encrypted data in a terminal is received, biometric key verification is performed by using a biometric key verification function built in a system of the terminal, and a response is made to the access request according to a verification result of the system of the terminal, so that access methods in existing data processing solutions are expanded. By means of an access method based on a biometric key such as a fingerprint key and a faceprint key, an operation process of accessing encrypted data is simplified, data access efficiency and data processing efficiency are improved, and intelligence of a terminal is improved.

Figure 12:
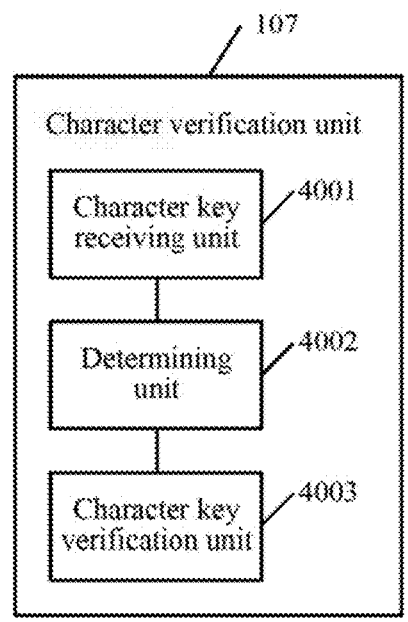
FIG. 12 is a schematic structural diagram of an embodiment of a character verification unit shown in FIG. 8.

Referring to FIG. 12, FIG. 12 is a schematic structural diagram of an embodiment of a character verification unit shown in FIG. 8. The character verification unit 107 may include a character key receiving unit 4001, a determining unit 4002, and a character key verification unit 4003.

The character key receiving unit 4001 is configured to receive the entered target character key in a character entry area of the terminal when the character key entry operation performed according to the key entry prompt information is detected.

The character key entry area may refer to an area provided by the terminal and used to enter a character, and may be a virtual keyboard of the terminal. The character key receiving unit 4001 receives the entered target character key in the character entry area of the terminal when the character key entry operation performed according to the key entry prompt information is detected.

The determining unit 4002 is configured to determine whether the target character key is the same as the reference character key.

The character key verification unit is configured to determine that verification succeeds when the target character key is the same as the reference character key, or determine that verification fails when the target diameter key is different from the reference character key.

In the present disclosure, when an access request for encrypted data in a terminal is received, biometric key verification is performed by using a biometric key verification function built in a system of the terminal, and a response is made to the access request according to a verification result of the system of the terminal, so that access methods in existing data processing solutions are expanded. By means of an access method based on a biometric key such as a fingerprint key and a faceprint key, an operation process of accessing encrypted data is simplified, data access efficiency and data processing efficiency are improved, and intelligence of a terminal is improved.

An embodiment of the present disclosure further provides a terminal. The terminal may include a data processing apparatus. For a structure and function of the apparatus, reference may be made to the foregoing related descriptions of the embodiments shown in FIG. 8 to FIG. 12 and details are not described herein again. It should be noted that the terminal may be applied to the method shown in FIG. 1 to FIG. 7.

Figure 13:
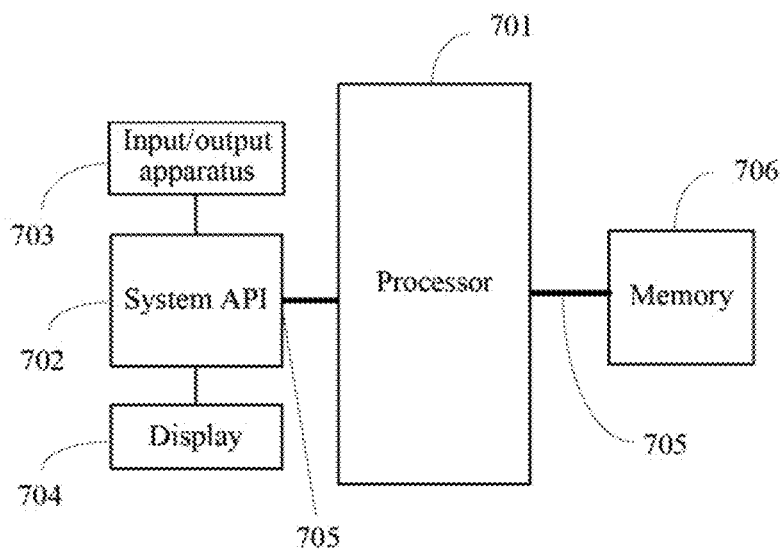
FIG. 13 is a schematic structural diagram of a terminal according to an embodiment of the present disclosure.

An embodiment of the present disclosure further provides another terminal. Referring to FIG. 13, FIG. 13 is a schematic structural diagram of an exemplary terminal 700 according to an embodiment of the present disclosure. As shown in FIG. 7, the exemplary terminal 700 may include, but is not limited to, a processor 701, a system API 702, an input/output apparatus 703 connected to the processor 701 by using the system API 702, a display 704, a bus 705, and a memory 706 connected to the processor 701 by using the bus 705.

The input/output apparatus 703 is configured to input/output information for the terminal 700. Specifically, the input/output apparatus 703 may include: a keyboard, a mouse, and a touch panel.

The display 704 is configured to display content or information output or generated by the terminal 700. When the input/output apparatus 703 is a touch panel, the touch panel may also be used as the display. That is, when the terminal 700 includes a touch panel, the input/output apparatus 703 may be integrated with the display 704.

The memory 706 is configured to store an Internet application. Specifically, the memory 706 may include a memory module (such as a ROM and a RAM), a flash memory module, and a large-capacity memory (such as a CD-ROM, a USB flash drive, and a removable hard disk).

The memory 706 stores a system program configured in the terminal 700. The system program may include, but is not limited to, a basic application program, A dynamic library is loaded in the memory 706. The dynamic library is a public library for running software and may store various plug-ins or programs. The dynamic library is a basic dependent package run by an application program and may be used to dynamically replace code and data in the memory. A third-party application may further be installed in the memory 706 to cooperate in completing a basic application function.

The memory 701 may include any suitable processor, and may further include a multithreading or parallel processing multi-core processor that is configured to call the program stored by the memory 706 by using the bus 705. When the terminal 700 runs a basic application function configuration, the processor 701 performs the following operations:

obtaining an access configuration of encrypted data in a terminal when an access request for the encrypted data is received, the access configuration including a biometric key access method and/or a character key access method;

outputting key entry prompt information according to the access configuration;

performing verification by calling a system API of the terminal to collect an entered target biometric key when a biometric key entry operation performed according to the key entry prompt information is detected, to obtain a verification result; and responding to the access request according to the verification result.

Alternatively, the memory 701 may include any appropriate processor, and may further include a multithreading or parallel processing multi-core processor that is configured to call the program stored by the memory 706 by using the bus 705. When the terminal 700 runs a basic application function configuration, the processor 701 performs the following operations:

configuring an access method for the encrypted data in the terminal; and generating an access configuration of the encrypted data according to the access method configured for the encrypted data;

obtaining the access configuration of the encrypted data when an access request for the encrypted data in the terminal is received, the access configuration including a biometric key access method and/or a character key access method;

outputting key entry prompt information according to the access configuration;

performing verification by calling a system API of the terminal to collect an entered target biometric key when a biometric key entry operation performed according to the key entry prompt information is detected, to obtain a verification result; and subsequently, responding to the access request according to the verification result;

performing verification by obtaining an entered target character key when a character key entry operation performed according to the key entry prompt information is detected, to obtain a verification result.

In the present disclosure, when an access request for encrypted data in a terminal is received, biometric key verification is performed by using a biometric key verification function built in a system of the terminal, and a response is made to the access request according to a verification result of the system of the terminal, so that access methods in existing data processing solutions are expanded. By means of an access method based on a biometric key such as a fingerprint key and a faceprint key, an operation process of accessing encrypted data is simplified, data access efficiency and data processing efficiency are improved, and intelligence of a terminal is improved.

Persons of ordinary skill in the art may understand that all or some of the processes of the methods in the embodiments may be implemented by a program instructing relevant hardware. The program may be stored in a computer readable storage medium, such as a non-transitory computer readable storage medium. When the program runs by the processor, the methods in the embodiments are performed. The foregoing storage medium may include: a magnetic disk, an optical disc, a read-only memory (Read-Only Memory, ROM), or a random access memory (Random Access Memory, RAM).

What is disclosed above is merely an example of embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A data processing method, comprising:
   outputting a character key entry prompt information on a first user interface of a terminal to carry out a character key access method;
   obtaining a character key entered though the first user interface;
   performing a configuration permission authentication by comparing the character key with a reference character key stored in the terminal;
   only in response to determining that the configuration permission authentication succeeds, configuring a biometric key access method for an encrypted data to obtain a reference biometric key, and the encrypted data being subsequently accessible through the biometric key access method;
   obtaining an access configuration of the encrypted data in the terminal when receiving an access request for the encrypted data, the access configuration comprising the biometric key access method;
   outputting a biometric key entry prompt information according to the access configuration;
   performing a verification by calling a system application programming interface (API) of the terminal to collect a biometric key, when a biometric key entry operation performed according to the key entry prompt information is detected;
   obtaining a verification result by comparing the collected biometric key with the reference biometric key; and
   responding to the access request according to the verification result when the collected biometric key matches the reference biometric key.

2. The method according to claim 1, before the obtaining an access configuration of encrypted data in a terminal, further comprising:
   configuring an access method for the encrypted data in the terminal; and
   generating the access configuration of the encrypted data according to the access method configured for the encrypted data.

3. The method according to claim 1, wherein the performing verification by calling a system API of the terminal and obtaining a verification result comprises:
   collecting, by calling the system API of the terminal, a biometric feature shown within a preset time in a biometric key entry area of the terminal, when the biometric key entry operation performed according to the key entry prompt information is detected; and submitting the collected biometric key to a system of the terminal, wherein the system of the terminal determines whether the collected biometric key is the reference biometric key in the system of the terminal, and when the collected biometric key is the reference biometric key in the system of the terminal, the verification succeeds, or when the collected biometric key is not the reference biometric key in the system of the terminal, the verification fails.

4. The method according to claim 1, after the outputting the key entry prompt information on the first user interface of the terminal, further comprising:

performing the verification by obtaining the character key when a character key entry operation performed according to the key entry prompt information is detected, and obtaining the verification result.

5. The method according to claim 4, wherein the performing the verification by obtaining the character key and obtaining the verification result comprise:

receiving the character key in a character entry area of the terminal, when the character key entry operation performed according to the key entry prompt information is detected;

determining whether the character key is a same as the reference character key; and determining that the verification succeeds, when the character key is the same as the reference character key, or determining that the verification fails, when the character key is different from the reference character key.

6. The method according to claim 1, wherein the responding to the access request according to the verification result comprises:

displaying content of the encrypted data, when the verification result is that the verification succeeds; or outputting access failure prompt information, when the verification result is that the verification fails.

7. A data processing apparatus, comprising:

a memory; and a processor coupled to the memory, wherein the processor is configured to:

output a character key entry prompt information on a first user interface of a terminal to carry out a character key access method;

obtain a character key entered though the first user interface;

perform a configuration permission authentication by comparing the character key with a reference character key stored in the terminal;

only in response to determining that the configuration permission authentication succeeds, configure a biometric key access method for an encrypted data to obtain a reference biometric key, and the encrypted data being subsequently accessible through the biometric key access method;

obtain an access configuration of the encrypted data in the terminal when receiving an access request for the encrypted data, the access configuration comprising the biometric key access method;

output a biometric key entry prompt information according to the access configuration;

perform a verification by calling a system application programming interface (API) of the terminal to collect a biometric key, when a biometric key entry operation performed according to the key entry prompt information is detected, and to obtain a verification result by comparing the collected biometric key with the reference biometric key; and respond to the access request according to the verification result when the collected biometric key matches the reference biometric key.

8. The apparatus according to claim 7, wherein the processor is further configured to:

configure an access method for the encrypted data in the terminal; and generate the access configuration of the encrypted data according to the access method configured for the encrypted data.

9. The apparatus according to claim 7, wherein the processor is further configured to:

collect, by calling the system API of the terminal, a biometric feature shown within a preset time in a biometric key entry area of the terminal when the biometric key entry operation performed according to the key entry prompt information is detected; and submit the collected biometric key to a system of the terminal, wherein the system of the terminal determines whether the collected biometric key is the reference biometric key in the system of the terminal, and when the collected biometric key is the reference biometric key in the system of the terminal, the verification succeeds, or when the collected biometric key is not the reference biometric key in the system of the terminal, the verification fails.

10. The apparatus according to claim 7, wherein the processor is further configured to:

perform the verification by obtaining the character key, when a character key entry operation performed according to the key entry prompt information is detected, and to obtain the verification result.

11. The apparatus according to claim 10, wherein the processor is further configured to:

receive the character key in a character entry area of the terminal, when the character key entry operation performed according to the key entry prompt information is detected;

determine whether the character key is the same as the reference character key; and determine that the verification succeeds when the character key is the same as the reference character key, or determine that the verification fails when the character key is different from the reference character key.

12. The apparatus according to claim 7, wherein the processor is further configured to:

display content of the encrypted data, when the verification result is that the verification succeeds; or output access failure prompt information, when the verification result is that the verification fails.

13. A non-transitory computer readable storage medium comprising a computer readable program stored thereon, wherein, when being executed, the computer readable program causes a computer to implement a data processing method, the method comprising:

outputting a character key entry prompt information on a first user interface of a terminal to carry out a character key access method;

obtaining a character key entered though the first user interface;

performing a configuration permission authentication by comparing the character key with a reference character key stored in the terminal;

only in response to determining that the configuration permission authentication succeeds, configuring a biometric key access method for an encrypted data to obtain a reference biometric key, and the encrypted data being subsequently accessible through the biometric key access method;

obtaining an access configuration of the encrypted data in the terminal when receiving an access request for the encrypted data, the access configuration comprising the biometric key access method;

outputting a biometric key entry prompt information according to the access configuration;

performing a verification by calling a system application programming interface (API) of the terminal to collect a biometric key, when a biometric key entry operation performed according to the key entry prompt information is detected, obtaining a verification result by comparing the collected biometric key with the reference biometric key; and responding to the access request according to the verification result when the collected biometric key matches the reference biometric key.

14. The non-transitory computer readable storage medium according to claim 13, wherein the configuring an access method for the encrypted data in the terminal comprises:

configuring the character key access method for the encrypted data in the terminal, and storing a reference character key used to perform character key verification;

performing a configuration permission authentication by using the reference character key, when receiving a request of configuring the biometric key access method for the encrypted data; and configuring the biometric key access method for the encrypted data, when the configuration permission authentication succeeds.

15. The non-transitory computer readable storage medium according to claim 13, after the outputting key entry prompt information on the first user interface of the terminal, the method further comprising:

performing the verification by obtaining the character key when a character key entry operation performed according to the key entry prompt information is detected, and obtaining the verification result.

16. The non-transitory computer readable storage medium according to claim 15, wherein the performing the verification by obtaining the character key and obtaining the verification result comprise:

receiving the character key in a character entry area of the terminal, when the character key entry operation performed according to the key entry prompt information is detected;

determining whether the character key is a same as the reference character key; and determining that the verification succeeds, when the character key is the same as the reference character key, or determining that the verification fails, when the character key is different from the reference character key.

17. The method according to claim 1, wherein the character key comprises a key using a character as a basis for encryption and decryption.

18. The method according to claim 17, wherein the character key comprises a numeric key, a letter key, or a key combining a digit and a letter.

* * * * *